United States Patent Office 3,808,295
Patented Apr. 30, 1974

3,808,295
VULCANIZABLE COMPOSITIONS
Eric George Kent and Yung-Kang Wei, Sarnia, Ontario, Canada, assignors to Polymer Corporation Limited, Sarnia, Ontario, Canada
No Drawing. Filed Oct. 26, 1972, Ser. No. 301,136
Claims priority, application Canada, Dec. 20, 1971, 130,463, 130,465
Int. Cl. C08d 9/08
U.S. Cl. 260—888       8 Claims

ABSTRACT OF THE DISCLOSURE

Synthetic elastomers such as polymers of conjugated alkadienes, styrene butadiene rubber, polybutadiene, butyl rubber or halogenated butyl rubber are blended with crystalline alternating copolymers of an alkadiene and acrylic nitrile to produce compositions having improved green strength.

Compounded with reinforcing agents, sulfur and accelerators these blends can be covulcanized to produce vulcanizates having improved tear strength.

This invention relates to vulcanizable elastomeric compositions containing a mixture of a synthetic rubber and a crystalline nitrile copolymer. In particular, it relates to carbon black reinforced compositions having improved green strength and tear strength.

The conventional synthetic elastomers such as butyl rubber, halogenated butyl rubber and stereoregular elastomers are deficient in "green" strength and exhibit upon compounding with carbon black and vulcanizing a poor tear strength. The green strength is a property of uncured rubber compound to resist deformation on the application of moderate stress forces; it is important in processing steps prior to vulcanization, e.g. building tires and facilitates the assembly of multiple components. The tear strength, on the other hand, is a property of vulcanized compositions determining, among others, the resistance of tire treads to chunking and chipping in service.

An object of this invention is to improve green strength and tear strength of synthetic elastomers. Another object is to provide elastomeric compositions having improved green strength and vulcanizates having improved tear strength.

These and other objectives have been acheived in accordance with this invention by providing an elastomeric composition comprising a mixture of about 50–98 parts by weight of a synthetic elastomeric polymer and about 2–50 parts by weight of a crystalline copolymer of an alkadiene and an acrylic nitrile. When compounded with rubber compounding ingredients comprising a reinforcing filler and a vulcanizing agent, the above elastomeric composition produces a compound which can be vulcanized to produce rubber products having improved tear resistance.

The synthetic elastomeric polymer which can be used in this invention may be a butyl rubber, a halogenated butyl rubber and a solid polymer of a conjugated alkadiene having 4–10 carbon atoms such as butadiene-1,3, isoprene, pentadiene-1,3. The solid polymer includes a homopolymer as well as a copolymer of such alkadiene with each other or with a minor proportion of a copolymerizable olefin such as styrene. It also includes an amorphous ethylene-propylene-diene copolymer.

Representative examples of such elastomeric polymers are poly(butadiene-1,3), poly(isoprene), poly(pentadiene-1,3), butadiene copolymers with up to about 50% by weight of styrene, alphamethylstyrene, vinyl pyridine, ethylene, propylene and similar comonomers. They can be prepared in an emulsion polymerization system in the presence of a free radical type catalyst or in solution systems using anionic type catalysts such as lithium alkyls, alfin catalyst or mixed catalysts of the Ziegler type such as aluminum alkyl and titanium cobalt or nickel compounds. The solution polymerized polymers are preferred and of these the most preferred are polybutadiene and polyisoprene containing at least 25% of the diene units in the cis-1,4 configuration. The butyl rubber that can be used as the synthetic elastomeric polymer is a high molecular weight polymer of $C_4$–$C_6$ isoolefin; the term includes both the homopolymer, e.g. polyisobutylene and the low unsaturation copolymer of isoolefin with a minor proportion of a multiolefin.

The butyl rubber is prepared by polymerizing a mixture of 85–100% by weight of an isoolefin containing 4–6 carbon atoms and 0–15% by weight of a $C_4$–$C_{10}$ multiolefin in a non-reactive diluent such as methyl chloride at very low temperatures of the order of −70° C. in the presence of a Friedel-Crafts type catalyst, e.g. aluminum chloride. The preferred isoolefin is isobutylene and the preferred multiolefin is isoprene. Other multiolefins may be used instead of or in addition to isoprene; they include butadiene-1,3, pentadiene-1,3, 2,3-dimethyl butadiene-1,3, 2,5-dimethyl hexadiene-1,5, cyclopentadiene, dicyclopentadiene, divinyl benzene. Isobutylene may be replaced in part by styrene. Representative examples of butyl rubber are solid polyisobutylenes and, isobutylene-isoprene copolymers containing about 0.5–5 mole percent unsaturation. The halogenated butyl rubber is preferred over the regular butyl rubber if the composition of this invention is to be vulcanized. It vulcanizes in the presence of sulfur and accelerators at a rate comparable to that of the crystalline copolymer and in the mixture with the crystalline copolymer and optionally other sulfur vulcanizable materials produces a strong covulcanizate. The vulcanizability of the halogenated butyl rubber is due to the presence of reactive halogen atoms in the polymeric chains. The halogen content may range from about 0.1 to about 15%, but preferably is from about 0.5 to 3% by weight of chlorine in the chlorinated material known as chlorobutyl and from about 1% to 4% by weight in the brominated material. The molecular weight of the elastomeric polymer may vary within wide limits from about 100,000 to about 3,000,000 or expressed in the terms of Mooney viscosity (M/L 4' at 100° C.) from a Mooney viscosity of about 15 to a Mooney viscosity above 150. The Mooney viscosity is determined according to ASTM D–1646 procedure.

The second component of the elastomeric composition of this inveniton is a crystalline copolymer of an alkadiene and an acrylic nitrile. It is a copolymer of essentially equimolar amounts of a conjugated $C_4$–$C_{10}$ alkadiene and an acrylic nitrile. The alkadiene may be either a 2-alkyl butadiene-1,3 containing 1–6 carbon atoms in the alkyl group or a mixture of not less than 40 mole percent of the said 2-alkyl butadiene-1,3 with not more than 60 mole percent of another conjugated alkadiene. Representative examples of 2-alkyl butadiene-1,3 are isoprene, dimethyl butadiene-1,3, 2-ethyl butadiene-1,3, of which isoprene is the most preferred. Other alkadienes include butadiene-1,3, pentadiene-1,3. The preferred alkadiene used in the preparation of crystalline alternating copolymer is a mixture of 50–100 mole percent of isoprene and 0–50 mole percent of butadiene-1,3. The alkadiene units in the copolymer are linked predominantly and preferably at least 75% in the trans 1,4 configuration. The acrylic nitrile comonomer in the crystalline copolymer is selected from acrylonitrile, methacrylonitrile, alkyl substituted acrylonitriles containing 2–6 carbon atoms in the alkyl group, vinylidene cyanide and methylene glutaronitrile, of which acrylonitrile is the most preferred. The nitrile units alternate with the alkadiene units and the polymeric molecules preferably show no contiguous units of the type: nitrile-nitrile, alkadiene-alkadiene, as can be determined by analysis of the infra-red (IR) or nuclear magnetic resonance (NMR) spectra.

The crystalline copolymer of alkadiene and nitrile is a solid material at about 25° C. showing a crystallinity content of about 5–35% as determined by the X-ray diffraction method. Other conventional methods of determining crystallinity can also be used; the results are comparable within about ±4%. Above the melting temperature which may range from about 60° C. to about 110° C., the solid copolymer softens to a viscous somewhat tacky mass which can be worked, blended and compounded in conventional rubber processing equipment. On cooling to a room temperature of about 25° C., the soft mass crystallizes and hardens. The rate of crystallization depends on the crystallinity level which in turn depends on the amount of 2-alkyl butadiene-1,3 present in the copolymer. The 1:1 copolymer of isoprene and acrylonitrile containing about 50 mole percent of isoprene can crystallize within about 10 minutes while the alternating copolymer containing about 25 mole percent of isoprene, 25 mole percent of butadiene and 50 mole percent of acrylonitrile may require up to 7 days to reach the crystallinity level as specified above.

The crystalline copolymer used in this invention is a novel copolymer which can be prepared by the copolymerization of the above-described alkadiene and acrylic nitrile in the presence of a complex catalyst comprising, for example, an organoaluminum halide complexed with acrylic nitrile and a transition metal compound. Except for the monomers, the copolymerization process is similar to the processes for the preparation of amorphous alternating copolymers described in British patent specifications 1,186,462 and 1,231,327.

The two polymers, the synthetic elastomeric polymer and the crystalline nitrile copolymer, may be blended by any suitable means on conventional rubber mills or in Banbury type internal mixers. They can also be blended in solution and the solid mixture recovered therefrom. Or it may be desirable to compound the polymeric components separately and then mix the two compounds. The ratio of the crystalline nitrile copolymer to the synthetic elastomer in the mixture depends on the specific use. In the tire tread application, the mixture preferably contains less than 25% by weight, say 2–20% by weight, of the crystalline copolymer and more than 75% by weight of stereoregular elastomers so as to preserve as much as possible the good dynamic properties, heat buildup and rebound, of these elastomers represented by cis-1,4 polybutadiene, cis-1,4 polyisoprene or lithium catalyzed polybutadine. When, on the other hand, the mixture is to be used in the production of conveyor belts, V belts, O-rings, gaskets and other applications where oil-resistance is also required, the mixture preferably contains from about 25 to about 50% by weight of the crystalline copolymer. Similarly in blends with butyl rubber, for a good resistance to weathering, oxygen, ozone and inorganic chemicals, the composition preferably contains a high ratio of say 75 to 68 parts by weight of butyl rubber and 2–25 parts of crystalline nitrile copolymer. The green strength of such composition is at least 5 times that of the butyl rubber type polymer and on curing, a vulcanizate is produced having improved tear resistance.

The composition of this application may be compounded with conventional rubber compounding ingredients: reinforcing fillers such as carbon black or silica and optionally plasticizers and extending oils, antioxidants and tackifying resins. The amount of these ingredients may vary within wide limits depending on the properties desired in the final product. For example, carbon black loading may range from about 20 to about 150 weight parts per 100 parts of polymeric material. As the loading of black increases, the compound becomes stiffer, more power is required when handling on rubber processing equipment and the vulcanized product is less resistant to tearing. The compounded composition of this invention has a higher tolerance for carbon black and retains good processability and tear resistance at higher black loadings than has been possible with the unblended elastomers such as cis-1,4 polybutadiene or cis-1,4 polyisoprene. An additional advantage of the compounded compositions of this invention is a higher green strength at comparable carbon black loadings, i.e. the compounds show a resistance to distortions due to cold flow and moderate stresses and can be easier handled when building a tire from multiple components. The vulcanizable compositions can be blended with other vulcanizable polymers such as polybutadiene, polyisoprene, styrene/butadiene elastomers, ethylene/propylene/diene terpolymers to produce compounds having improved green strength and then covulcanized to produce strong rubbers with improved resistance to tear.

The vulcanization behavior of the compositions of this invention is similar to that of conventional synthetic rubber compositions. It is preferred to vulcanize these compositions with a conventional sulfur vulcanization system comprising sulfur, zinc oxide and accelerators selected from any of the guanidine, sulfenamide, thiuram and dithiocarbamate types.

The vulcanized products are characterized by the retention of most of the desired physical properties of the synthetic elastomer vulcanizates, remarkable improvement in the tear strength and acquisition of some oil-resistance. The compositions containing stereoregular elastomers are suitable for use in tire treads, conveyor belts, while those containing butyl rubber or halogenated butyl rubber can be used for the production of inner tubes, liners for tubeless tires, sidewalls.

The invention is further illustrated by the following examples.

EXAMPLE 1

A polymeric composition was prepared by blending on a two-roll rubber mill a cis-1,4 poly(butadiene-1,3) and a crystalline copolymer in the 1:1 proportion. The cis-1,4 polybutadiene was a linear about 98% cis-1,4 polymer produced in solution in a hydrocarbon solvent in the presence of a catalyst formed by mixing an alkyl aluminum halide and cobalt salt and had a Mooney viscosity of 42. The crystalline copolymer was prepared by coploymerizing a mixture of butadiene and isoprene mixed in a molar ratio of 3:7 with acrylonitrile in solution in methylene chloride using as the catalyst a complex of ethyl aluminum dichloride and acrylonitrile mixed with vanadyl chloride. The copolymer showed a crystallinity of about 20% measured by differential thermal method and an intrinsic viscosity of 0.7 deciliter/gram measured at 30° C. in dimethyl formamide. It contained about 50 mole percent of acrylonitrile units alternating with trans-1,4 units of butadiene or isoprene.

The blend was sheeted, pressure molded and then subjected to stress-strain tests in the unvulcanized condition. For comparison, a specimen of unblended cis-1,4 polybutadiene was also subjected to the same treatment and the results are shown in Table I.

TABLE I

|  | Composition 1 | Control Experiment A |
|---|---|---|
| 100% modulus (kg./cm.$^2$) | 15 | 1 |
| 300% modulus (kg./cm.$^2$) | 23 | 1 |
| Tensile strength (kg./cm.$^2$) | 40 | 1 |
| Elongation (percent) | 530 | 500 |

Composition 1 showed a significant resistance to stretching while the control experiment was rather weak.

A second composition was made by blending the crystalline copolymer of Composition 1 with a cis-1,4 polyisoprene in the 1:1 proportion. The polyisoprene had a cis-1,4 content of about 97% and a Mooney viscosity of about 90. The composition was sheeted, pressure molded and tested for stress-strain properties. The unblended polyisoprene was used as a control and is shown in Table II as Control Experiment B.

TABLE II

|  | Composition 2 | Control Experiment B |
|---|---|---|
| 100% modulus (kg./cm.²) | 45 | 3 |
| 300% modulus (kg./cm.²) | 65 | 2 |
| Tensile strength (kg./cm.²) | 87 | 2.5 |
| Elongation (percent) | 450 | 1,100 |

The difference in moduli and tensile strength between Composition 2 and Control Experiment B is more pronounced than that between Composition 1 and Experiment A shown in Table I. It is obvious that the 1:1 blends of a crystalline alternating copolymer and cis-1,4 polybutadiene or cis-1,4 polyisoprene have a green strength about 15 times the green strength of unblended hydrocarbon polymers, judging from the 100% modulus values.

EXAMPLE 2

Two tire tread compounds were prepared on a rubber mill using a blend of 90 parts by weight of cis-1,4 polybutadiene and cis-1,4 polyisoprene, respectively, and 10 parts by weight of an alternating copolymer of isoprene and acrylonitrile. The alternating copolymer was produced by copolymerizing in solution in methylene chloride an equimolar mixture of isoprene and acrylonitrile in the presence of the mixed catalyst as described in Example 1. The copolymer showed an X-ray crystallinity of about 25% and an intrinsic viscosity of about 0.5 deciliter/gram measured at 30° C. in dimethyl formamide.

The compounding recipe was as follows, in parts by weight:

| | |
|---|---|
| Polymer | 100 |
| Zinc oxide | 3 |
| Stearic acid | 1.5 |
| N(1,3-diphenyl butyl)N'-phenyl p-phenylene diamine | .5 |
| N,N'-di-1,4 dimethyl pentyl p-phenylene diamine | .5 |
| N-cyclohexyl-2-benzothiazole sulfenamide | 1.2 |
| High abrasion furnace carbon black | 60.0 |
| Diphenylguanidine | .3 |
| Sulfur | 2.0 |
| Naphthenic oil | 10.0 |

The compounds were sheeted, molded and tested for stress-strain properties in the unvulcanized state and after vulcanization at 153° C. for 20 minutes. For comparison, two compounds were prepared using cis-1,4 polybutadiene and cis-1,4 polyisoprene, respectively, instead of the blends with crystalline copolymers. The results are presented in Table III.

TABLE III

|  | Compound 3 | 4 | Control C | Control D |
|---|---|---|---|---|
| Cis-polybutadiene | 90 |  | 100 |  |
| Cis-polyisoprene |  | 90 |  | 100 |
| Alternating copolymer | 10 | 10 |  |  |
| Properties of green compound: |  |  |  |  |
| 100% modulus (kg./cm.²) | 14.5 | 10 | 2 | 1.2 |
| Tensile strength (kg./cm.²) | 6 | 10 | 2 | 1.2 |
| Elongation (percent) | 300 | 150 | 320 | 290 |
| Properties of cured compounds cured at 153° C. for 20 minutes: |  |  |  |  |
| 100% molulus (kg./cm.²) | 30 | 40 | 30 | 30 |
| 300% modulus (kg./cm.²) | 155 | 173 | 160 | 150 |
| Tensile strength (kg./cm.²) | 227 | 205 | 185 | 255 |
| Elongation (percent) | 380 | 440 | 320 | 440 |
| Tear strength ¹ (kg./cm.) | 23 | 26 | 5 | 5 |

¹ Measured in a "Trouser Test" which was performed on a 5 cm. x 2.5 cm. sheet sample having a 3 cm. deep cut at the centre of the short side so as to form two "legs." The "legs" were clamped in the jaws of an Instron tester. (Instron is a trademark) and then pulled apart at a speed of 5 cm./min.

Judging from modulus and tensile strength values shown in the table, the green strength of Compound 3 was between 3 and 7 times that of Control C and Compound 4 was about 8 times as strong as Control D. The table also shows that the tear strength of the cured compounds made in accordance with this invention is about 5 times that of the corresponding control compounds. This improvement was achieved without sacrificing any of the stress-strain properties.

EXAMPLE 3

A butyl rubber was blended with the crystalline nitrile copolymer of Example 1 in the 1:1 proportion by weight. The butyl rubber was a high molecular weight copolymer of isobutylene and isoprene containing 1.6 mole percent unsaturation derived from the copolymerized isoprene units and having a Mooney viscosity M/L—12' at 125° C. of 49.

The blend made on a two-roll rubber mill was sheeted, pressure molded and then tested for stress-strain properties in the green unvulcanized state. The stress-strain properties, modulus, tensile strength and elongation were determined using microdumbbells having a narrow cross-section of 0.6 mm. x 6 mm. pulled at a speed of 50 cm./min. in an Instron tester. For comparison, similar specimens were prepared from the constituents of the blend and subjected to the same tests. The results are shown in Table IV.

TABLE IV

|  | Composition | | |
|---|---|---|---|
|  | Control D | 5 | Control E |
| Polymer | Butyl rubber | 1:1 blend | Crystalline nitrile. |
| Green properties: |  |  |  |
| 100% modulus (kg./cm.²) | 3 | 20 | 11. |
| 300% modulus (kg./cm.²) | 3 | 28 | 20. |
| Ultimate tensile strength (kg./cm.²) | 1 | 50 | 24. |
| Elongation (percent) | 2,000+ | 500 | 385. |

The results indicate that the 1:1 blend of butyl rubber and crystalline nitrile copolymer has higher moduli values and ultimate tensile strength than the constituents of the blend, Control A and Control B.

EXAMPLE 4

A blend of 90 parts by weight of the butyl rubber used in Example 1 and 10 parts by weight of the crystalline nitrile rubber of Example 2 was prepared on a rubber mill and compounded using the following recipe, in parts by weight:

| | |
|---|---|
| Polymer | 100 |
| Fast extruding furnace carbon black | 25 |
| Semi-reinforcing furnace carbon black | 25 |
| Petroleum oil (S.G. 0.88, Saybolt viscosity 350 seconds at 26.7° C.) | 25 |
| Hydrated aluminum silicate (99% passing through 300 mesh) | 25 |
| Zinc oxide | 5 |
| Mercaptobenzothiazole | 0.5 |
| Tetramethyl thiuram disulfide | 0.5 |
| Sulfur | 2.0 |

The compound was pressure molded to form two sheets, about 0.6 mm. thick. Dumbbell specimens were cut from one sheet and used for testing stress-strain properties of the unvulcanized (i.e. green) composition. The other sheet was cured for 20 minutes at 153° C. and test specimens were cut for testing stress-strain properties and tear strength of the vulcanized compositions. The tear strength was determined using the Trouser test described in Example 2. For comparison, a control experiment was carried out on a similar compound except for the polymer which consisted of butyl rubber only. The results are presented in Table V.

TABLE V

| | Composition | |
|---|---|---|
| | 6 | Control F |
| Green properties: | | |
| 100% modulus (kg./cm.²) | 10 | 2 |
| 300% modulus (kg./cm.²) | 5 | 1.6 |
| Elongation (percent) | 1,200+ | 1,200+ |
| Cured properties (20 min. at 153° C.): | | |
| 100% modulus (kg./cm.²) | 12 | 5 |
| 300% modulus (kg./cm.²) | 19.5 | 25 |
| Ultimate tensile strength (kg./cm.²) | 21.5 | 118 |
| Elongation (percent) | 460 | 730 |
| Tear strength (kg./cm.) | 10 | 5 |

The above table shows that Composition 6 compound had a higher modulus at 100% elongation in both the green and vulcanized state and, therefore, a better resistance to deformations at moderate stresses of up to about 10 kg./cm.². Composition 6 also showed higher tear strength than Control C but otherwise the vulcanized properties were poor. Apparently, the blend of the low unsaturation (50 mole percent) crystalline copolymer did not covulcanize satisfactorily in the presence of sulfur.

EXAMPLE 5

A 1:1 blend of a bromobutyl and the crystalline nitrile copolymer of Example 1 was made on a rubber mill. The bromobutyl was a derivative of the butyl rubber used in Example 3. It contained 2.1% by weight of bromine and had a Mooney viscosity (M/L—12' at 125° C.) of 48.

The blend was sheeted, pressure molded and then tested for stress-strain properties using an Instron tester. Bromobutyl sheet was used as a control. The results are shown in Table VI.

TABLE VI

| | Polymer | |
|---|---|---|
| | 1:1 blend bromobutyl and nitrile | Bromobutyl control |
| 100% modulus (kg./cm.²) | 25 | 3.5 |
| 300% modulus (kg./cm.²) | 30 | 3.5 |
| Ultimate tensile strength (kg./cm.²) | 57 | 1 |
| Elongation (percent) | 570 | 2,000+ |

The blend had a significantly higher green strength than bromobutyl and handled on the mill as a firm elastomeric composition.

EXAMPLE 6

Bromobutyl used in Example 5 was blended with the crystalline nitrile copolymer of Example 2 in a proportion of 90:10 by weight. The blend was compounded on a mill using the following recipe, in parts by weight:

Polymer _____ 100
Semi-reinforcing furnace carbon black _____ 50
Stearic acid _____ 1
Zinc oxide _____ 5

The compound was sheeted, molded and then vulcanized in the manner as described in Example 4. Test specimens cut out from unvulcanized and vulcanized sheets were tested for stress-strain properties. The vulcanized sheet was additionally tested for tear strength and resistance to flexing. A similar compound based on the unblended bromobutyl was used as control. The results are presented in Table VII.

TABLE VII

| | Control 100% bromobutyl | 90/10 blend bromobutyl/ nitrile |
|---|---|---|
| Green properties: | | |
| 100% modulus (kg./cm.²) | 3 | 21 |
| Ultimate tensile strength (kg./cm.²) | 7 | 10 |
| Ultimate elongation (percent) | 1,200+ | 1,200+ |
| Cured 20 minutes at 153° C.: | | |
| 100% Modules (kg./cm.²) | 10 | 14 |
| Ultimate tensile strength (kg./cm.²) | 145 | 108 |
| Ultimate elongation (percent) | 520 | 430 |
| Tear stength (kg./cm) | 2 | 9.5 |
| Wendes flex (kcy./cm.) ASTM-D-813-59 | | (¹) |

¹ No crack growth in 250 kcy.

The unvulcanized (green) composition based on the 90/10 blend of bromobutyl and crystalline nitrile copolymer showed a significantly higher 100% modulus and an increased tensile strength in comparison to the control composition.

The zinc oxide vulcanized sample of the blend showed higher 100% modulus and tear strength values than the control.

EXAMPLE 7

An inner liner compound was prepared by mixing Masterbatch A in a Banbury mixer, adding Curatives B on a rubber mill, followed by normal calendering procedure:

Masterbatch A:                               Parts by weight
   Bromobutyl of Example 6 _____ 90
   Nitrile copolymer of Example 6 _____ 10
   Semi-reinforcing furnace black _____ 62.5
   Petroleum oil (S.G. 0.88, Saybolt viscosity 350
     $\mu$sec. at 26.7° C.) _____ 14.0
   Stearic acid _____ 1.0
   Phenol formaldehyde resin [1] _____ 4.0
Curatives B:
   Zinc oxide _____ 5.0
   Sulfur _____ 0.5
   Benzothiazyl disulfide _____ 1.25

[1] Available in commerce under the tradename Amberol ST-137X.

A control compound was also prepared using the above recipe except for the replacement of nitrile copolymer with the same amount of bromobutyl.

The compounds were tested in the usual manner for Mooney viscosity before and after aging for 7 days at 50° C. for scorch and green tensile strength.

The vulcanized properties were tested on standard specimens which were cured for 30 minutes at 166° C.

The results are presented in Table VIII.

TABLE VIII

| | Compound | |
|---|---|---|
| | 7 | Control |
| Bromobutyl/nitrile copolymer (pts./pts.) | 90/10 | 100 |
| Compound properties: | | |
| Mooney (M/L-4' at 100° C.)—unaged | 56 | 48 |
| Mooney increase on aging for 7 days at 50° C. | 5 | 6 |
| Mooney scorch time at— | | |
| 125° C | 23 | 18 |
| 138° C | 12 | 9.5 |
| Tensile strength (kg./cm.²) at room temperature: | | |
| With grain | 4.2 | 3.1 |
| Across grain | 3.8 | 3.0 |
| Vulcanizate properties (cure time 30 minutes at 166° C.): | | |
| Hardness (Shore A-2) | 67 | 51 |
| 100% modulus (kg./cm.²) | 17 | 9 |
| 300% modulus (kg./cm.²) | 66 | 34 |
| Tensile strength (kg./cm.²) | 107 | 94 |
| Elongation (percent) | 460 | 720 |

Compound 7 was less scorchy than the control indicating that there is a greater margin in processing safety. It showed an improved tensile strength at room temperature and at elevated temperatures such as encountered in rubber processing. In calendering, it produced a sheet of excellent smoothness in contrast to a nervy appearance in the control sheet.

When vulcanized, Compound 7 produced a stronger rubber material showing higher modulus, tensile strength and hardness than the control compound.

EXAMPLE 8

Three elastomeric bonding compositions were prepared by mixing in a Banbury mixer, initially at 115° C., and then on a cold mill, the following ingredients, in parts by weight:

Butyl rubber _____ 100
Nitrile copolymer _____ Variable
Polyterpene resin (M.P. 115° C.) _____ 20
Semi-reinforcing furnace black _____ 65
Polybutene oil (M.W. of 890) _____ 20

The butyl rubber was a compound of isobutylene and isoprene containing 2.2 moles percent unsaturation and having a Mooney viscosity (M/L-8' at 100° C.) of 45. The nitrile copolymer was the same as used in Example 2.

The mixed compositions were each tested for: extrusion rate at 150° C. at 30 r.p.m. using a Royle 5 cm. extruder and a 1 cm. square die; compound Mooney (M/L-8' at 100° C.); hardness; compression resistance; yield strength; flow at 94° C. under load of 680 gms.; and low temperature flex.

The compression resistance test was performed on an assembly consisting of two 7.5 cm. x 7.5 cm. glass plates separated by two strips of the sealant composition to be tested. The strips, 7.5 cm. long and 1 cm. x 1 cm. in cross-section, were located near the opposite sides of the assembly. The glass area in contact with the strips was primed with a thin coat consisting of a mixture of 100 parts butyl rubber, 20 parts clay, 75 parts semi-reinforcing furnace black, 115 parts polyterpene resin (M.P. 115° C.) and 12 parts N-beta(aminoethyl)-gamma(aminopropyl) trimethoxysilane; the coat was applied in the form of a 30% dispersion in hexane. The assembly was heated to 94° C. and then the force required to compress the strips to a gap of 0.500±0.005 cm. was measured. The force required to maintain the compressed strips at the thickness of 0.5 cm. was also measured after 1 minute of relaxation and is reported in the table below as a residual load.

The yield was tested on an assembly similar to that used for compression resistance testing except for one glass plate which was replaced by a steel plate. The assembly was compressed at room temperature of about 25° C. to a gap of 0.5 cm. between the plates. The plates were then pulled apart in a tensile tester at a jaw separation rate of 2 cm./min.

The flow test was carried out on an assembly like that used for yield strength testing. The assembly was heated to 94° C., compressed in a hydraulic press to a strip thickness of 0.500 cm. and conditioned for 1 hour at 94° C. under a weight of 680. The overall thickness of the conditioned assembly was then measured. Next, the assembly was held for 24 hours at 94° C. under the same weight and the thickness was again determined. The difference was recorded in Table IX as flow at 94° C.

Low temperature flex was tested on a 15 cm. long tape of 1 cm. x 1 cm. rectangular cross-section which was conditioned for 2 weeks at 88° C. and then for 4 hours at −29° C. The tape was bent 180° C. around a 2.5 cm. diameter mandrel and, if not cracked, the tape was considered to pass the test.

The results are presented in Table IX.

TABLE IX

| Sealant | 1 | 2 | 3 |
|---|---|---|---|
| Nitrile copolymer (parts) | 15 | 30 | 50 |
| Extrusion rate at 150° C.: | | | |
| Gms./15 sec | 78.4 | 82.5 | 63.1 |
| Cm./15 sec | 66.0 | 87.7 | 76.2 |
| Ratio (gm./cm.) | 1.19 | 0.94 | 0.83 |
| Mooney viscosity (M/L-8' at 100° C.) | 37.0 | 38.5 | 37.5 |
| Hardness (Shore 00) | 88 | 87 | 89 |
| Compression resistance at 94° C. (kg./assembly) | 52 | 45 | 52 |
| Residual load (kg./assembly) | 2.5 | 3.4 | 5.2 |
| Yield strength (kg./assembly) | 91 | 88 | 79 |
| Type of failure | | Cohesive | |
| Flow at 94° C. (mm.) | 0.05 | 0.08 | 0.11 |
| Low temperature flex test | Pass | Pass | Pass |

The above data indicate that all sealant compositions showed fast extrusion rates with sealant 2 showing the highest linear rate. Sealant 2 also showed the lowest compression resistance at 94° C. which is highly desirable when installing auto windshields. The residual load, yield strength and flow of sealant 2 were intermediate between those of sealants 1 and 3, all being more than satisfactory and meeting the requirements of motor manufacturers for elastomeric bonding tape.

What is claimed is:

1. An elastomeric composition comprising a mixture of about 50–98 parts by weight of a solid polymer of a $C_4$–$C_{10}$ conjugated alkadiene selected from the group consisting of polybutadiene-1,3, polyisoprene, copolymers of butadiene-1,3 and isoprene, copolymers of isoprene or butadiene-1,3 with less than about 35% by weight of styrene, butyl rubber and halogenated butyl rubber and about 2–50 parts by weight of a crystalline, alternating copolymer of essentially equimolar amounts of a $C_4$–$C_{10}$ alkadiene and an acrylic nitrile, the amount of crystallinity being about 5–35% when measured by X-ray diffraction at about 25° C., said alkadiene in the crystalline copolymer being a mixture of about 40–100 mole percent of a 2-alkyl butadiene-1,3 containing 1–6 carbons in the alkyl group and 0–60 mole percent of a straight chain conjugated alkadiene with at least 75% of the alkadiene units being polymerized in the trans-1,4 configuration.

2. The composition of claim 1 wherein the synthetic polymer is a polymer of a conjugated alkadiene containing at least 25% of the alkadiene units in the cis-1,4- configuration.

3. The composition of claim 1 wherein the synthetic elastomeric polymer is a copolymer of butadiene with less than about 35% by weight of styrene.

4. The composition of claim 1 wherein the synthetic polymer is a butyl rubber or a halogenated butyl rubber.

5. The composition of claim 4 wherein the butyl rubber is a copolymer of 85–99.5% by weight of isobutylene and 0.5–15% by weight of a copolymerizable multiolefin selected from the group consisting of butadiene-1,3, isoprene, 2,3-dimethyl butadiene-1,3, pentadiene-1,3, 2,5 dimethyl hexadiene 1,5, cyclopentadiene and divinyl benzene.

6. The composition of claim 4 wherein the halogenated butyl rubber contains between 0.1 and about 15% by weight of halogen selected from chlorine or bromine.

7. The composition of claim 1 compounded with rubber compounding ingredients comprising a reinforcing filler and a vulcanizing agent.

8. A process of producing an elastomeric composition having improved green strength which comprises forming the mixture of claim 1 and compounding the mixture with a reinforcing agent and a vulcanizing agent to produce a vulcanizable composition.

References Cited

UNITED STATES PATENTS

| 3,400,086 | 9/1968 | Orr | 260—894 |
| 3,629,373 | 12/1971 | Embree | 260—894 |
| 3,644,590 | 2/1972 | Coulthard | 260—894 |

FOREIGN PATENTS

| 1,186,462 | 4/1970 | Great Britain | 260—83.7 |

MURRAY TILLMAN, Primary Examiner

J. ZIEGLER, Assistant Examiner

U.S. Cl. X.R.

260—82.3, 890, 894